Patented Sept. 9, 1941

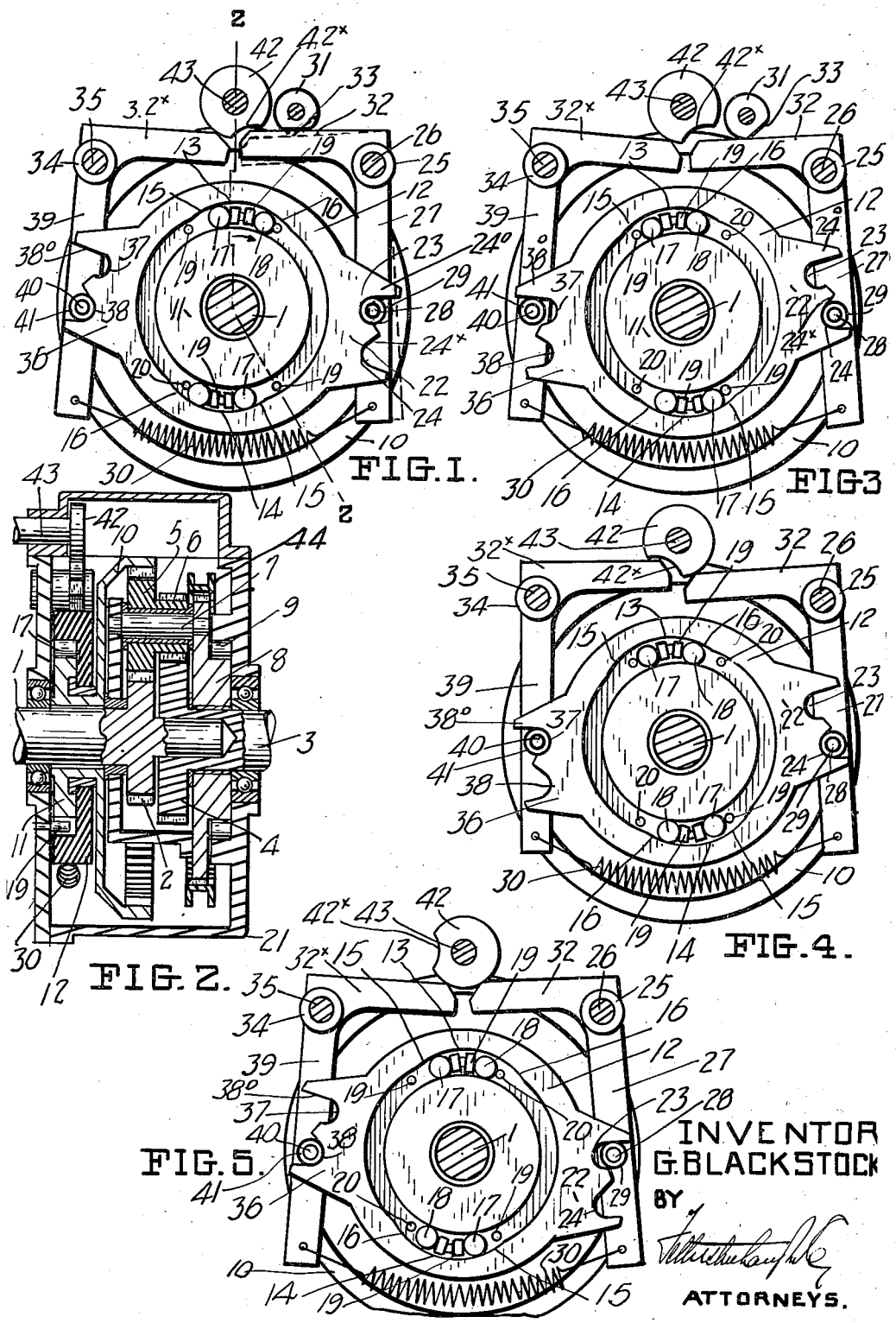

2,255,309

UNITED STATES PATENT OFFICE 2,255,309

REVERSIBLE FREEWHEEL DEVICE

Gibbs Blackstock, Toronto, Ontario, Canada

Application September 3, 1940, Serial No. 355,138

14 Claims. (Cl. 192—47)

My invention relates to improvements in reversible free wheel devices and the object of the invention is to devise a device primarily but not exclusively intended for use with motor car transmissions of the planetary type, which is adapted to control a rotary member, normally allowing it to revolve in one direction only but releasable to allow opposite rotation when required and it consists essentially of the arrangement and construction of parts hereafter described.

Fig. 1 is a face elevation of the essential parts of my device in the drive position.

Fig. 2 is a sectional view on lines 2—2 Fig. 1, showing my device connected to a 3-speed planetary gearing in diagrammatic form to illustrate the relation of my device to the coacting parts of a transmission.

Fig. 3 is a similar view to Fig. 1 showing the parts in the release or reverse position.

Fig. 4 is a similar view to Fig. 3 showing the device locked in the reverse position.

Fig. 5 illustrates how the locking of the device is prevented so that the rotary member can move in either direction and is therefore held out of action.

In the drawing like characters of reference indicate corresponding parts in the different views.

In a transmission the rotary member referred to in the preamble and forming part of the reaction member is that part which is held against retrograde motion to effect the indirect drive controlled by the device, so that it can revolve forward to allow a higher drive to engage and on release of the device can go backwards to let a lower drive engage. The transmission employed to illustrate the operation of my device consists of the following parts indicated in Fig. 2.

1 is the drive shaft of a transmission provided with a drive gear 2. 3 is the driven shaft provided with a gear 4 driven from the drive gear through the planet gears 5 and 6 forming planet clusters only one of which is shown. The integral gears 5 and 6 are mounted on short shafts 7 carried in the carrier 8 mounted freely on the drive and driven shafts 1 and 3. The reaction member of the intermediate drive controlled by my device includes the gear ring 10 and annulus 11.

As before stated the foregoing parts forming a transmission are merely described for the purpose of illustration and are not essential parts of my present invention.

Essentially my device consists of a rotary annular member which forms part of the reaction member, a floating member stationary but for a limited arc of motion between two positions which may be called the first or drive position and the second or release or reverse position, means for locking it in the drive position or if desired in the reverse position also, two sets of free wheel members referred to hereafter as the drive and catch rollers coacting with two sets of oppositely acting wedging cams on the floating member, and stationary obstructions hereafter referred to as kick studs, so placed that only the drive or first set of rollers can act when the floating member is in the drive posiiton, the catch or second set of rollers being held off their coacting cams, and only the catch rollers acting when the floating member is in the release or reverse position. It may be regarded as a modification of the general type shown in my Patents Nos. 1,942,197, 1,942,198 and 1,947,374 to the case where one of the parts is stationary, a reaction clutch instead of a coupling, with appropriate differences in design and detail.

A floating member 12 in Fig. 1 is locked in the drive position. The interior of the member 12 is provided with diametrically opposite curved recesses 13 and 14 each forming cam surfaces 15 and 16 between each of which and the exterior peripheral surface of the annulus 11 are located drive rollers 17 and catch rollers 18 held apart by suitable spring separators 19.

A casing 21 contains the transmission and my control. 19 and 20 are what I term kick studs forming stationary obstructions which project inward from the casing 21 into the space between the annulus 11 and the floating member 12 and serve to free the rollers 17 and 18 from engagement with the cam surfaces 15 and 16.

The drive shaft 1 and driven shaft 3 and their gears 2 and 4 connected through the planetary gears 5 and 6 mounted in the carrier 8 can be held from retrograde motion by an ordinary free wheel connection 9 to give a lower drive. To lock the floating member in the position indicated in Fig. 1 or in the drive position with the annulus locked against rearward rotation I provide the following device.

The floating member 12 is provided with a radial extension 22 in the end of which is formed a locking pocket 23 and a non-locking pocket 24. A bell crank arm 25 is pivoted on a stud 26 extending from the casing 21 forming a fixed stationary part and carries on the long or main depending arm 27 thereof a lock stud 28 provided with an antifriction roller 29 which alternately enters in the pockets 23 and 24 of the floating member, the pocket 23 being a lock pocket preventing the angular movement of the floating member when engaged by the roller 29 and the pocket 24 a non-locking pocket offering small resistance to the angular movement of the floating member when engaged by the roller 29. The lower end of the arm 27 is held by a light tension spring 30 secured to any suitable anchoring point.

A trip release 31 as in Figs. 1 and 3 is provided engaging the short arm 32 of the arm 25 and is in the form of a cylindrical collar having a flat face 33 clearing the short arm 32 when the parts are in the locking position.

When the annulus 11 of the reaction member is rotated forward in the direction of arrow (see Fig. 1) it rotates freely, the catch rollers 18 being held from engagement with the cam surfaces 16 by the kick studs 20. If reverse torque is applied to the annulus 11 the drive rollers 17 will jamb between the annulus and the cam surface 15 and hold the annulus as the floating member is locked by the roller 29 engaging the lock pocket 23.

To release the device the trip release is momentarily turned to the dotted position shown in Fig. 1, letting the crank arm 25 turn on its pivot formed by the stud 26 to carry the roller 29 out of the lock pocket 23 and thereby free the floating member to move angularly.

The backward motion of the annulus 11 acting through the drive rollers 17 will then carry the floating member over nearly to the release position which may be approximately through an arc of 15° to 20° when the roller 29 by the action of the spring 30 engages the inclined face 24$^x$ as it enters the non-locking pocket 24 and by the tension of the spring presses the roller 29 against the inclined face 24$^x$ to complete the rotation of the floating member. The annulus 11 can now go freely backward, the drive rollers 17 being held off by the studs 19, as in Fig. 3.

Thus the device is released by unlocking the floating member 12 and applying back torque or turn to the annulus 11 and reset by a momentary forward motion of the annulus. As this forward motion takes place the floating member 12 is locked to the annulus by the catch rollers 18 as in Fig. 3 and as the floating member is carried forward the inclined face 24$^x$ forces the roller 29 out of the pocket 24 swinging the lever arm 27 outward against the tension of the spring 30 so that by further rotation of the floating member it is carried against the finger 24° and driven into the lock pocket 23 by the tension spring 30.

If it is desired to lock the device against forward rotation of the annulus while allowing backward motion I provide the following device. Referring to Fig. 1.

A lever 34 similar to and opposing the lever 27 is provided. The lever 34 is pivoted on a stud 35 also extending from the casing 21. The floating member 12 is provided with a radial extension 36. The extension 36 extends from the floating member at a point diametrically opposite to the radial extension 22. The extension 36 is provided with a lock pocket 37 and a release pocket 38 similar to the pockets 23 and 24 previously described.

From the long arm 39 of the lever 34 extends a stud 40 on which is mounted a roller 41 fitting either the pocket 37 or 38. The lower end of the arm 39 is connected to the opposite end of the spring 30.

A control head 42 is secured to a shaft 43 journalled in the casing 21. The head 42 is cylindrical and is provided with a peripheral recess 42$^x$, and coacts with the ends of the short arms 32 and 32$^x$ of the levers 25 and 34.

In Fig. 3 the device cannot lock in the release or reverse position because the control head 42 rocks the arm 32$^x$, 39 down and out so that the lock wheel or roller 41 cannot enter the lock pocket 37.

To lock the device against forward rotation the control head 42 is turned to allow the end of the arm 32$^x$ to enter the recess 42$^x$ to allow the roller 41 to be pulled inward by the spring 30 from the unlocked position clear of the pocket 38 as shown in Fig. 3 into engagement with such pocket as in Fig. 4. When in this position the roller 18 is carried by the forward rotation of the annulus into engagement with the cam surface 16. At the same time the lock roller 29 is held out of action by the control head 42, the end of the arm 32 being in this position carried out of the recess 42$^x$ to engage the periphery of the head 42.

Backward rotation of the annulus 11 from the position shown in Fig. 1 will carry the floating member to the reverse position where it locks, the lock roller 41 entering the pocket 37, that is the device is "drag locked" by releasing or reversing it when the control head 42 is set to let it so lock. It can be unlocked by turning the control head 42 to the position shown in Fig. 3 to force the roller 41 out of the pocket 37. Instead of employing a head 42 this operation may be effected by another trip release similar to the trip release 31 coacting with the lever arm 32$^x$ or by the same trip 31 placed so as to act on both arms 32 and 32$^x$.

In Fig. 5 the control head 42 is in such a position that it holds both arms 32 and 32$^x$ down and therefore holding the levers 27 and 39 and their rollers 29 and 41 in the out of action position enabling the annulus 11 to rotate freely in either direction.

When the device is applied to a motor car the control head 42 is preferably operated by hand as from the lever controlling the manual gear changes such as reverse, while the trip release is operated from the clutch pedal, or it may be connected also to the brake pedal, or to a foot button, or it may be controlled by a governor if so desired.

In such an assembly the device would control the changes between low and intermediate drives in automatic or semi-automatic manner.

During intermediate drive the device would be in the drive position as in Fig. 1, the reaction member 11, 10 being held against retrograde motion yet able to rotate forward to allow for a higher drive. The change down is effected by pressing the clutch pedal which unlocks the device by means of the trip 31, having the throttle somewhat open as the pedal comes up, which by the interaction of the gears causes the reaction member 11, 10 to go backwards thereby releasing the device to let the drive pass to the lower train.

The change up is by momentary throttling of the engine enough to make the reaction member go forward and so reset the device in the drive position shown in Fig. 1.

If it is desired to use the braking effect of the engine through the intermediate train, the control head 42 is turned to the position shown in Fig. 4 by hand. The device is then released or reversed by a momentary opening of the throttle producing backward rotation of the annulus 11 as hereinbefore explained and locks in the reverse or drag position as in Fig. 4 which prevents forward rotation of the reaction member 11, 10 so that the engine acts as a brake when throttled. For return to normal operating conditions the control head is turned back to the position shown in Figs. 1 and 3.

With some designs of transmission it may be useful to have the device entirely out of action at times, as in neutral. The control head may then be connected to take the position shown in Fig. 5 holding both arms 27 and 39 down and out so that there can be no locking in either position.

The trip release may be connected to the brake pedal so that when the brakes are applied the device is unlocked. If the car is then slowed to such a speed in relation to that of the idling engine that the reaction member turns backward the device will be released and the drive will pass on to the lower gear train. In this way many of the down changes may be quite automatic.

It is pointed out that only braking to relatively low speeds will effect this change. If the car is at such a speed when the throttle is reopened that the reaction member is going forward, the floating member will have relocked in the drive position.

From the foregoing it will be seen that the device can be used to control a member whose natural reaction is forward, that is the member of an over drive drive instead of a reduction gear train. Furthermore, as multi-speed planetary units are known with two intermediate drives and corresponding reaction members, two such devices may be used in the same machine.

In fact the device can be used to control any sort of member or members which at times is to be allowed rotation in one direction only yet at other times is allowed opposite rotation.

In a complete 3-speed transmission there has to be some direct drive connection for example a coupling like the automatic one shown in my Patent No. 1,909,607 used to lock the reaction member 11, 10 to the drive shaft, but as the exact nature of it is not important for the present application I have merely indicated the possibility of a direct drive by the clutch ring 44 which by locking the gear 6 would have the desired effect.

Reference to the Patents Nos. 1,942,197, 1,942,198 and 1,947,374 mentioned in the beginning of this application will show the coupling type of reversible freewheel there shown could be used as a reaction clutch. This device is, however, better adapted for such position and use on the grounds of simplicity and economy of axial space, of which it requires only about three-quarters of an inch unless it is to take very heavy loads.

If the lock wheels 29 and 41 are of true anti-friction type, the unlocking requires very little effort even under full load, which is a very useful feature in some kinds of planetary transmission where the usual engine clutch is replaced by a reaction brake for the low gear member since in such cases the engine is not normally disconnected from the transmission by pressing the pedal and the device may be under load when it is to be unlocked.

If the working of the device is carefully followed from the drawings, it can be seen that the rollers 17 and 18 must in any case be relieved of load by unlocking the floating member before being struck off by the kick studs 19 and 20 and that being a free wheel type of clutch the device cannot engage except on perfect synchronization, hence it will be quite free from shock or any harmful kind of wear.

What I claim as my invention is:

1. In a free wheel device, the combination with a fixed stationary part, of a rotatable annulus mounted in the stationary part, a floating member mounted concentrically to the annulus to have limited freedom of angular movement between a drive and a release position, releasable locking means carried by the stationary part and coacting means on the floating member for locking the floating member in the drive position, cam faces on the surface of the floating member, wedging means held freely between the annulus and floating member adapted to coact with the cam faces when the annulus is rotated to turn the floating member from the drive to the release position, obstructions carried by the stationary part in the path of the wedging means to allow coaction when the floating member approaches the release position, whereby the rotation of the annulus from the drive to the release position is prevented when the floating member is in the drive position but not when it is locked in the drive position.

2. In a free wheel device, the combination with a fixed stationary part, of a rotatable annulus mounted in the stationary part, a floating member mounted concentrically to the annulus to have limited freedom of angular movement between a drive and a release position, releasable locking means carried by the stationary part and coacting means on the floating member for locking the floating member in the drive position and to allow of motion to the release position when unlocked, opposing spaced apart inclined cam faces formed on the internal surfaces of the floating member, a pair of rollers located between the cam faces and between the annulus and the floating member, an obstruction carried by the stationary part on each side of the pair of rollers and so placed as to allow coaction between one roller and its adjacent cam face when the floating member is in the drive position and between the other roller and its adjacent cam face when the floating member is in the release position and whereby the rotation of the annulus in the direction from the drive towards the release position is prevented when the floating member is locked in the drive position.

3. In a free wheel device, the combination with a fixed stationary part, of a rotatable annulus mounted in the stationary part, a floating member mounted concentrically to the annulus to have limited freedom of angular movement between a drive and a release position, means carried by the stationary part and coacting means on the floating member for releasably locking the floating member in the drive and in the release positions, spaced apart opposing inclined cam faces formed in the interior of the floating member, a pair of rollers between the annulus and the floating member and located between the cam faces, each roller coacting with its adjacent cam to turn the floating member in a corresponding direction, stationary obstructions so placed as to allow only one roller to coact with one cam when the floating member is in the drive position and only the other roller with the other cam when the floating member is in the release position, whereby the rotation of the annulus from the drive to the release position is prevented when the floating member is locked in the drive position and the rotation of the annulus in the opposite direction is prevented when the floating member is locked in the release position.

4. In a free wheel device, the combination with a fixed stationary part, a rotatable annulus mounted in the stationary part, a floating member mounted concentrically to the annulus to have limited freedom of angular movement between a drive and a release position, means carried by the stationary part and coacting means on the floating member for releasably locking the floating member in the drive position, an internal arcuate recess formed in the floating member and forming opposing inclined wedging faces, a pair of rollers engaging the exterior face of the annulus within the recess of the floating member, each roller coacting with a cam face, and stationary obstructions so placed that when the floating member is in the driving position one roller and cam face are engaged and when in the release position the other roller and cam face are engaged.

5. In a free wheel device, the combination with a fixed stationary part, of a rotatable annulus mounted in the stationary part, a floating member mounted concentrically to the annulus to have limited freedom of angular movement between a drive and a release position, releasable radially operating locking means carried by the stationary part and coacting means on the floating member for locking the floating member in the drive position and to allow of motion to the release position when unlocked, opposing spaced apart inclined cam faces formed on the surfaces of the floating member, a pair of rollers located between the cam faces and between the annulus and the floating member, an obstruction carried by the stationary part on each side of the pair of rollers and so placed as to allow coaction between one roller and its adjacent cam face when the floating member is in the drive position and between the other roller and its adjacent cam face when the floating member is in the release position and whereby the rotation of the annulus in the direction from the drive towards the release position is prevented when the floating member is locked in the drive position.

6. In a free wheel device, the combination with a fixed stationary part, of a rotatable annulus mounted in the stationary part, a floating member mounted concentrically to the annulus to have limited freedom of angular movement between a drive and a release position, a locking arm pivotally mounted on the stationary part, a projecting locking member on the arm, a coacting lock pocket on the floating member formed to lock and unlock the floating member when in the drive position, opposing spaced apart inclined cam faces formed in the surface of the floating member, a pair of rollers located between the cam faces and between the annulus and the floating member, an obstruction carried by the stationary part on each side of the pair of rollers and so placed as to allow coaction between one roller and its adjacent cam face when the floating member is in the drive position and between the other roller and its adjacent cam face when the floating member is in the release position and whereby the rotation of the annulus in the direction from the drive towards the release position is prevented when the floating member is locked in the drive position.

7. In a free wheel device, the combination with a fixed stationary part, of a rotatable annulus mounted in the stationary part, a floating member mounted concentrically to the annulus to have limited freedom of angular movement between a drive and a release position, a radially acting anti-friction locking member carried on the stationary part, a coacting locking pocket in the floating member formed to effect the positive locking of the floating member in the drive position and to allow of its unlocking under load substantially without resistance, opposing spaced apart inclined cam faces formed in the internal surface of the floating member, a pair of rollers located between the cam faces and between the annulus and the floating member, an obstruction carried by the stationary part on each side of the pair of rollers and so placed as to allow of coaction between one roller and its adjacent cam face when the floating member is in the drive position and between the other roller and its adjacent cam surface when the floating member is in the release position and whereby the rotation of the annulus in the direction from the drive towards the release position is prevented when the floating member is locked in the drive position.

8. In a free wheel device, the combination with a fixed stationary part, of a rotatable annulus mounted in the stationary part, a floating member mounted concentrically to the annulus to have limited freedom of angular movement between a drive and a release position, a locking arm pivotally carried on the stationary part, a projecting locking member on the arm, two coacting pockets in the floating member, one adapted to receive the projecting locking member to lock the floating member in the drive position and the other adapted to hold the floating member yieldingly in the release position, and resilient means for lightly pressing the locking member into the pockets, opposing spaced apart inclined cam faces formed in the internal surface of the floating member, a pair of rollers located between the cam faces and between the annulus and the floating member, an obstruction carried by the stationary part on each side of the pair of rollers and so placed as to allow coaction between one roller and its adjacent cam face when the floating member is in the drive position and between the other roller and its adjacent cam face when the floating member is in the release position and whereby the rotation of the annulus in the direction from the drive towards the release position is prevented when the floating member is locked in the drive position.

9. In a free wheel device, the combination with a fixed stationary part, of a rotatable annulus mounted in the stationary part, a floating member mounted concentrically to the annulus to have limited freedom of angular movement between a drive and release position, a spring pressed locking arm pivotally carried on the stationary part, a locking member on the arm and coacting pockets in the floating member corresponding to the two angular positions thereof, and a finger so formed between the pockets that as the floating member approaches either angular position the pressure of the locking member into the adjacent pocket turns the floating member on to that position, cam faces adapted to change their position by the relative change in angular position between the floating member and annulus, a pair of rollers located between the cam faces and between the annulus and the floating member, an obstruction carried by the stationary part on each side of the pair of rollers and so placed as to allow coaction between one roller and its adjacent cam face when the floating member is in the drive position, and between the other roller and its adjacent cam face when the floating member is in the release position, whereby the rotation of the annulus in the direction from the drive towards the release position is prevented when the floating member is locked in the drive position.

10. In a free wheel device, the combination with a fixed stationary part, of a rotatable annulus mounted in the stationary part, a floating member mounted concentrically to the annulus to have limited freedom of angular movement between a drive and a release position, a locking arm pivotally mounted on the stationary part, a projecting locking member on the arm, a coacting lock pocket on the floating member formed to lock and unlock the floating member when in the drive position, tripping means controllable at discretion by the operator for tripping the arm momentarily to unlock the floating member and separate means also controllable at discretion by the operator to alternately permit or prevent the locking movement of the locking arm, opposing spaced apart inclined cam faces formed in the surface of the floating member, a pair of rollers located between the cam faces and between the annulus and the floating member, an obstruction carried by the stationary part on each side of the pair of rollers and so placed as to allow coaction between one roller and its adjacent cam face when the floating member is in the drive position and between the other roller and its adjacent cam face when the floating member is in the release position and whereby rotation of the annulus in the direction from the drive to the release position is prevented when the floating member is locked in the drive position.

11. In a free wheel device, the combination with a fixed stationary part, of a rotatable annulus mounted in the stationary part, a floating member mounted concentrically to the annulus to have limited freedom of angular movement between a drive and a release position, two locking arms for locking the floating member respectively in the drive and release positions and pivotally carried on the stationary part, a locking member on each arm, two locking pockets on the floating member, a pocket coacting with each locking arm locking member to alternately lock the floating member in the drive and release position, means for disengaging the locking members from the pockets to unlock the floating member, opposing spaced apart inclined cam faces formed in the internal surface of the floating member, a pair of rollers located between the cam faces and between the annulus and floating member, an obstruction carried by the stationary part on each side of the pair of rollers and so placed as to allow coaction between one roller and its adjacent cam face when the floating member is in the drive position and between the other roller and its adjacent cam face when the floating member is in the release position and whereby rotation of the annulus in the direction from the drive towards the release position is prevented when the floating member is locked in the drive position.

12. In a free wheel device, the combination with a fixed stationary part, of a rotatable annulus mounted in the stationary part, a floating member mounted concentrically to the annulus to have limited freedom of angular movement between a drive and a release position, a locking arm pivotally carried on the stationary part, locking elements between the arm and the floating member formed to lock the floating member in the drive position, means for unlocking the locking elements, opposing spaced apart inclined cam faces formed in the internal surface of the floating member, a pair of rollers located between the cam faces and between the annulus and the floating member, an obstruction carried by the stationary part on each side of the pair of rollers and so placed as to allow coaction between one roller and its adjacent cam face when the floating member is in the release position and whereby the rotation of the annulus in the direction from the drive towards the release position is prevented when the floating member is locked in the drive position.

13. A device for use in association with an automobile transmission gearing of planetary type including a rotary reaction member adapted to effect indirect drive when prevented from rotation, and comprising a free wheel device including a stationary part, an annulus forming part of the rotary reaction member, a floating member having a limited freedom of angular movement between a drive and release position, means for locking the floating member in the drive position releasable to allow such floating member to move to the release position, two oppositely acting cam faces formed on the floating member, rollers coacting with the cam faces to turn the floating member from the drive to the release position and to return the same, stationary obstructions so placed as to allow roller contact with one cam only when the floating member is in the drive position and with the other cam only when the floating member is in the release position, whereby the rotation of the annulus from the drive to the release position is prevented when the floating member is locked in the drive position.

14. A device for use in association with an automobile transmission gearing of planetary type including a rotary reaction member adapted to effect indirect drive when prevented from rotation, and comprising a free wheel device including a stationary part, an annulus forming part of the rotary reaction member, a floating member having a limited freedom of angular movement between a drive and release position, means for locking the floating member in the drive position releasable to allow such floating member to move to the release position, two oppositely acting cam faces formed on the floating member, rollers coacting with the cam faces to turn the floating member from the drive to the release position and to return the same, stationary obstructions so placed as to allow roller contact with one cam only when the floating member is in the drive position and with the other cam only when the floating member is in the release position, pedal-operated means actuating the said locking means to unlock the floating member, and control means operated by hand to selectively allow or prevent the unlocking of the floating member, whereby the rotation of the annulus from the drive to the release position is prevented when the floating member is locked in the drive position.

GIBBS BLACKSTOCK.